(12) United States Patent
Gould

(10) Patent No.: US 7,918,734 B2
(45) Date of Patent: Apr. 5, 2011

(54) GAMING SERVER PROVIDING ON DEMAND QUALITY OF SERVICE

(75) Inventor: Kenneth Gould, Oakton, VA (US)

(73) Assignee: Time Warner Cable, a division of Time Warner Entertainment Company, L.P., New York, NY (US)

( * ) Notice: Subject to any disclaimer, the term of this patent is extended or adjusted under 35 U.S.C. 154(b) by 2122 days.

(21) Appl. No.: 10/261,245

(22) Filed: Sep. 30, 2002

(65) Prior Publication Data

US 2004/0063497 A1    Apr. 1, 2004

(51) Int. Cl.
A63F 13/00 (2006.01)
H04L 12/66 (2006.01)
H04L 12/64 (2006.01)
G08C 15/00 (2006.01)

(52) U.S. Cl. ............. 463/42; 463/41; 370/352; 370/236

(58) Field of Classification Search .................. 370/352, 370/236, 360, 447; 709/232, 205, 229; 719/318; 463/42, 40, 41

See application file for complete search history.

(56) References Cited

U.S. PATENT DOCUMENTS

| | | | | |
|---|---|---|---|---|
| 5,408,465 | A * | 4/1995 | Gusella et al. ................. | 370/231 |
| 5,644,355 | A | 7/1997 | Koz et al. | |
| 6,124,878 | A | 9/2000 | Adams et al. | |
| 6,137,793 | A | 10/2000 | Gorman et al. | |
| 6,230,203 | B1 | 5/2001 | Koperda et al. | |
| 6,272,150 | B1 * | 8/2001 | Hrastar et al. ................. | 370/486 |
| 6,297,845 | B1 * | 10/2001 | Kuhn et al. .................... | 348/192 |
| 6,308,216 | B1 | 10/2001 | Goldszmidt et al. | |
| 6,335,927 | B1 | 1/2002 | Elliott et al. | |
| 6,351,773 | B1 * | 2/2002 | Fijolek et al. ................. | 709/228 |
| 6,374,402 | B1 | 4/2002 | Schmeidler et al. | |
| 6,378,130 | B1 | 4/2002 | Adams | |
| 6,404,738 | B1 | 6/2002 | Reininger et al. | |
| 6,415,317 | B1 | 7/2002 | Yelon et al. | |
| 6,419,332 | B1 * | 7/2002 | Caldwell et al. .............. | 312/285 |
| 6,434,624 | B1 | 8/2002 | Gai et al. | |
| 6,442,158 | B1 | 8/2002 | Beser | |
| H002051 | H * | 11/2002 | Zhu et al. .................. | 370/395.21 |
| 6,636,505 | B1 * | 10/2003 | Wang et al. .................... | 370/352 |

(Continued)

FOREIGN PATENT DOCUMENTS

EP    0 848560 A2 *    6/1998

(Continued)

OTHER PUBLICATIONS

CableLabs, Radio Frequency Interface Specification SP-RFIv1.1-107-010829, retrieved from http://www.cablelabs.com/specifications/archives/SP-RFI_v1.1_107-010829.pdf, Aug. 2001, pp. 1-10, 145-180 and 263-312.*

CableLabs, Packetcablet(TM) Dynamic Quality-of-service Specification PKT-SP-DQOS-103-020116, Jan. 2002, pp. 3-22.*

(Continued)

Primary Examiner — Melba Bumgarner
Assistant Examiner — Frank M Leiva
(74) Attorney, Agent, or Firm — The Marbury Law Group, PLLC

(57) ABSTRACT

The present invention teaches methods and systems for providing a gaming server system (Gaming System) for enabling a quality-of-service on-demand (QoS) broadcast system to provide a gaming computer or game console with premium levels of quality-of-service. The gaming server provides premium network connection service levels based upon customer profile, current activity, account status or other criteria.

74 Claims, 7 Drawing Sheets

U.S. PATENT DOCUMENTS

| | | | |
|---|---|---|---|
| 6,803,863 B1 * | 10/2004 | Yang | 341/11 |
| 7,354,345 B2 * | 4/2008 | Bortnik et al. | 463/42 |
| 7,632,186 B2 * | 12/2009 | Spanton et al. | 463/40 |
| 2001/0024434 A1 * | 9/2001 | Ayyagari et al. | 370/347 |
| 2002/0010938 A1 * | 1/2002 | Zhang et al. | 725/95 |
| 2002/0019886 A1 | 2/2002 | Sanghvi et al. | |
| 2002/0046406 A1 * | 4/2002 | Chelehmal et al. | 725/87 |
| 2002/0059635 A1 | 5/2002 | Hoang | |
| 2002/0087657 A1 * | 7/2002 | Hunt | 709/217 |
| 2002/0118699 A1 | 8/2002 | McKinnon, III et al. | |
| 2002/0119821 A1 * | 8/2002 | Sen et al. | 463/42 |
| 2002/0133598 A1 * | 9/2002 | Strahm et al. | 709/228 |
| 2002/0137565 A1 * | 9/2002 | Blanco | 463/46 |
| 2002/0143914 A1 * | 10/2002 | Cihula | 709/223 |
| 2003/0085888 A1 * | 5/2003 | Lafruit | 345/419 |
| 2003/0137942 A1 * | 7/2003 | Ladegaard | 370/252 |
| 2003/0154174 A1 * | 8/2003 | Tassel et al. | 705/412 |
| 2003/0216185 A1 * | 11/2003 | Varley | 463/42 |
| 2003/0229779 A1 * | 12/2003 | Morais et al. | 713/153 |
| 2004/0009815 A1 * | 1/2004 | Zotto et al. | 463/42 |
| 2004/0064504 A1 * | 4/2004 | Domschitz | 709/203 |

FOREIGN PATENT DOCUMENTS

| | | |
|---|---|---|
| WO | WO 9933301 A1 * | 7/1999 |
| WO | WO 9950999 A1 * | 10/1999 |
| WO | WO 0036871 A1 * | 6/2000 |

OTHER PUBLICATIONS

Cisco Systems, DiffServ—The Scalable End-to-End QoS Model, White Paper, 2001.*

Cisco Systems, DOCSIS i.i for Cisco uBR7200 Series Universal Broadband Routers, Oct. 2001.*

CableLabs, DOCSIS(TM) Overview, Aug. 2002.*

CableLabs, PacketCable(TM) Dynamic Quality-of-Service Specification PKT-SP-DQOS-103-020116, Jan. 2002, pp. 3-22.*

CableLabs, Packetcablet(TM) Dynamic Quality-of-service Specification PKT-SP-DQOS-103-020116, Jan. 2002, pp. 3-22 retrieved from http://www.cablelabs.com/specifications/archives/PKT-SP-DQOS-103-020116.pdf.*

CableLabs, Radio Frequency Interface Specification SP-RFIv1.1-107-010829, retrieved from http:llwww.cablelabs.comlspecificationslarchivesISP-RFI_vl. 1_107-010829.pdf, Aug. 2001, pp. 1-10, 145-180 and 263-312.*

Cisco Systems, DiffServ—The Scalable End-to-End QoS Model, White Paper, 2001.

Cisco Systems, DOCSIS 1.1 for Cisco uBR7200 Series Universal Broadband Routers, Oct. 2001.

CableLabs, DOCSIS(TM) Overview, Aug. 2002.

CableLabs, PacketCable(TM) Dynamic Quality-of-Service Specification PKT-SP-DQOS-103-020116, Jan. 2002, pp. 3-22.

* cited by examiner

GAMING SERVER PROVIDING ON DEMAND QUALITY OF SERVICE

FIELD OF THE INVENTION

The present invention relates to methods for providing enhanced quality-of-service (QoS) to online gaming users of game networks. More specifically, it relates to a method for supporting network-based gaming with quality-of-service assigned to an address in computer networks supporting dynamic allocation of QoS.

BACKGROUND OF THE INVENTION

Video gaming has long been the province of individual game systems such as personal computers with stored games, Nintendo® and PS-2® systems that interact on a user's television or on an integral screen. Such systems can also interact with one another (as in the Gameboy® systems) thereby allowing users on different systems to interact with another on a particular game. For purposes of these applications, such systems are collectively referred to as "game consoles."

This desire for interactive gaming has expanded to the Internet where individuals can engage in a gaming experience on a server, and of late, interact with other users in a specific game on a specific server. This desire for "network gaming" is growing.

Network-based gaming involves one or more persons playing a game using Customer Premises Equipment (CPE) (such as a personal computer or game consoles) where those CPEs are connected together by a carrier network to a gaming web server. As used herein, a "Carrier Network" generally refers to a computer network through which users communicate with various service providers (e.g. gaming web servers). The Carrier Network extends from the location of each user to an intermediate switched/routed network (hereinafter "Intermediate Network"). A gaming web server, in turn, is connected to the Intermediate Network, either directly or indirectly via the Internet, for communications with the users. The Carrier Network is maintained by a "Carrier," which also may serve as a service provider for certain services. For example, a Carrier or a related entity may serve as an Internet service provider (ISP).

Carrier Networks include "Shared Access Carrier Networks," in which data of multiple users are conveyed together over a shared communications medium between the users and the Intermediate Network, and "Dedicated Connection Carrier Networks," in which data of each user are conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

Network carriers and their equipment providers have adopted industry standards in order to increase interchangeability and reduce manufacturing costs for network hardware. For example, DOC Carriers have adopted industry standards such as the Data Over Cable Service Interface Specification (DOCSIS). DOCSIS version 1.0 was issued in 1997 with hardware devices being certified starting in 1999. DOCSIS version 1.1 replaced version 1.0 in 1999-2001. Although released, DOSIS version 2.0 is not yet widely available. As a result, networks conforming to DOCSIS (i.e. DOCSIS-compliant) use DOCSIS version 1.0 and 1.1 hardware in most cases.

FIG. 1 illustrates an example of such a typical DOCSIS-compliant network. Data packets are transmitted in a downstream direction from a cable modem termination system (CMTS) 21, which is located in headend 31 (or distribution hub) of a Carrier, over a coaxial cable 22 to respective cable modems (CMs) 14 of users. All of CMs 14 are attached by the coaxial cable 22 to the CMTS 21 in an inverted tree configuration, and each CM 14 connected to the coaxial cable 22 listens to all broadcasts from the CMTS 21 transmitted through the coaxial cable 22 for data packets addressed to it, and ignores all other data packets addressed to other CMs 14.

Theoretically, a CM 14 is capable of receiving data in the downstream direction over a 6 MHz channel with a maximum connection speed of 30-40 Mbps. Data packets also are transmitted in the upstream direction over a 2 MHz channel by the CMs 14 to the CMTS 21 typically using time division multiplexing (TDM) and at a maximum connection speed of 1.5-10 Mbps (up to 30 Mbps when DOCSIS version 2.0 is available)

The headend 31 in the DOCSIS Network includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOCSIS network includes a plurality of Cable Networks 20 originating from CMTSs at the headend 31 of the Carrier, with a particular Cable Network 21 being illustrated in an expanded view in FIG. 1. The DOCSIS network may also include multiple headends, for example, 31, 32 and 33.

Game playability for participants is often affected by the speed and quality of their respective network connections. This results in many participants preferring high-speed network connections, for example, cable networks (see FIG. 1) and digital subscriber link (xDSL) networks. In many of the popular game programs, game playability is ultimately limited by the player with the slowest and lowest quality network connection. As a result, many game participants ("gamers") opt for the higher speeds available of DOCSIS networks.

Data transmission over a DOCSIS network can be thought of as a downstream data path and an upstream data path. Downstream paths normally refer to transmission from a web server to a workstation or personal computer user. Upstream data transmission is the opposite with data originating in the workstation 11 or personal computer 12.

In the example of a gaming network, downstream data packets originate with a gaming web server. Such data comprises Internet protocol packaged graphic images, audio signals and textual information. Upstream flowing Internet packets comprise authenticating and "sign-in" information, as well as cursor and game control instructions.

An economy of gaming web server resources results in the case of online gaming with two or more garners participating in the same game session. In this situation, the game instructions respond to upstream flowing game control instructions. Instructions are normally executed in a first-in fashion. Once a game instruction is executed, the graphics, audio signals, or representations of other participating gamer responses can be transmitted downstream to all the participants.

When a cable modem 14 in a DOCSIS network is initialized, at least one downstream path, typically 6 MHz wide, from the cable-modem-termination system 21 to cable modem 14 is set up. The allocation is made so as to ensure coexistence of television broadcasts and data connections. In addition at least one upstream path is established. The upstream path, even when within the cable network, does not usually have a bandwidth of 6 MHz.

The frequency ranges occupied are different as well. Downstream paths are typically in the range of 50 MHz to approximately 1 GHz while the upstream paths are within 5 MHz to 42 MHz with a specific slot defined by the cable-modem-termination system.

As a cable modem 14 is initialized in a DOCSIS network, it registers with a cable-modem-termination system 21. As part of a registration request message, the cable modem forwards configuration information to the CMTS. This exchange also establishes the properties of the CM to the CMTS. If the data over cable network supports Quality-of-Service, the DOCSIS network may allocate resources to the cable modem in the course of registration. DOCSIS version 1.1 and version 1.1 compliant hardware have significant quality-of-service (QoS) enhancements as compared to version 1.0.

DOCSIS version 1.0 uses a static QoS model that is based on a class of service (CoS) that is preprovisioned in the TFTP configuration file for the cable modem. The CoS is a bi-directional QoS profile that has limited control, such as peak rate limits in either direction, and relative priority on the upstream data stream.

DOCSIS version 1.0 defines the concept of a service identifier (SID), that specifies the devices allowed to transmit and provides device identification and CoS.

In DOCSIS version 1.0, each CM is assigned only one SID, creating a one-to-one correspondence between a cable modem and the SID. All traffic originating from, or destined for, a cable modem is mapped to that cable modem's SID.

Typically, a DOCSIS version 1.0 cable modem has one CoS and treats all traffic the same, which means that data traffic on a cable modem can interfere with the quality of other traffic. The CMTS, however, can prioritize downstream traffic based on IP precedent type-of-service (ToS) bits. For example, voice calls using higher IP precedence bits receive a higher queuing priority (but without a guaranteed bandwidth or rate of service). A DOCSIS version 1.0 cable modem could increase voice call quality by permanently reserving bandwidth for voice calls, but then that bandwidth would be wasted whenever a voice call is not in progress.

In contrast to version 1.0, DOCSIS version 1.1 implemented a number of changes to allow great flexibility in the ability of a cable modem and service provider to transmit almost any combination of data traffic and real-time traffic. These changes required a fundamental shift in how a cable modem requests service and how traffic can be transmitted across the cable network.

In DOCSIS version 1.1, a service flow gets created at the time of cable modem registration (a static service flow) or as a result of a dynamic Media Access Control layer ("MAC") message handshake between the cable modem and the CMTS (a dynamic service flow). At any given time, a service flow might be in one of three states (provisioned, admitted, or active). Only active flows are allowed to pass traffic on the DOCSIS link.

Every service flow has a unique (unique per DOCSIS MAC domain) identifier called the service flow identifier (SFID). The upstream flows in the admitted and active state have an extra Layer 2 SID associated with them. The SID is the identifier used by the MAC scheduler when specifying time-slot scheduling for different service flows.

When a packet is presented to the DOCSIS MAC layer at the CMTS or cable modem, it is compared to a set of packet classifiers until a matching classifier is found. The SFID from this classifier is used to identify the service flow on which the packet will be sent. The packet is then transferred to the service flow manager for rate shaping and output queuing.

In the upstream direction, the output queues at the cable modem are remotely served by the CMTS MAC scheduler, based on DOCSIS version 1.1 slot scheduling constraints such as grant-interval and grant-jitter. In the downstream direction, the CMTS packet scheduler serves the flow queues depending on the flow attributes like traffic priority, guaranteed rate, and delay bound.

The principal mechanism for providing enhanced QoS is to classify data packets into service flows. A service flow is a MAC-layer transport service that provides unidirectional transport of packets to upstream packets transmitted by the cable modem or to downstream packets transmitted by the CMTS.

DOCSIS version 1.1 adds several new MAC scheduling disciplines to provide guaranteed QoS for real-time service flows on the multiple access upstream channel.

Multiple grants per interval help in supporting multiple subflows (such as voice calls) on the same SID. Multiple subflows per SID reduce the minimum SID requirement in cable modem hardware. The CMTS is responsible for supporting QoS for all cable modems in its control. The traffic in the downstream is assumed to be a combination of voice, committed information rate (CIR) data, and excess burst best-effort data.

While DOCSIS quality-of-service is limited to the cable network, users of a gaming network are more interested in the overall quality-of-service (QoS-game). QoS-game collectively specifies the performance of a gaming network service that a device expects on a network. QoS parameters include transit delay expected to deliver data to a specific destination, the level of protection from unauthorized monitoring or modification of data, cost for delivery of data, expected residual error probability, the relative priority associated with the data and other parameters.

FIG. 2 illustrates a simplified view of a typical gaming network. Downstream data packets originate in gaming web server 47, are transmitted over the Internet and routed to CMTS 21 in headend 31. From CMTS 21, the downstream packets are routed over cable 22 to cable modem 14 via the cable network. Cable modem 14 is connected to game console 11 (or other device performing as a game console, for example a personal computer). In similar fashion upstream data packets originate in game console 11 and are routed to gaming web server 47 via cable network 20 and Internet connection 50.

Overall quality-of-service to a gamer using a game network of FIG. 2 is dependent upon both downstream QoS and upstream QoS. Downstream QoS, in turn, depends upon the QoS between game console 14 and CMTS 21 and also the QoS between CMTS 21 and gaming web server 47. Similarly, upstream QoS depends on the QoS between gaming web server 47 and CMTS 21 along with QoS between CMTS 21 and game console 14.

User perceptions of quality-of-service for online gaming in gaming networks differs from other network QoS such as television transmission, voice over Internet (VoIP) or data access. In general, gaming networks have asymmetrical needs. Downstream feeds of video and audio signals need high downstream bandwidth for near real-time performance.

In contrast, upstream control instructions have low bandwidth overhead but require low latency routing. In order to economically allocate network resources it is desirable to provide gaming networks with QoS custom fitted to gaming needs. For example, a gamer might want a higher QoS during a gaming session but will not require enhanced QoS for other functions not associated with the game in question (i.e. instant chat, web surfing etc).

Thus what would be useful is a system and method by which game players can reserve gaming network quality-of-service when desirous of playing online in enhanced environment. Such a system would allow selectively enhanced QoS for gaming activity but not necessarily for other activity. In addition, such a system would also allow a gamer to reserve the enhanced QoS only for a time desired, thereby saving network resources. The system would also take advantage of the ability to economically allocate network resources by taking advantage of the asymmetrical nature of gaming networks. Finally, the system would allow a means by which carriers and providers of game content can extract increased revenue from game participants using enhanced game quality-of-service (QoS-game).

BRIEF SUMMARY OF THE INVENTION

Cable network providers need a means to provide premium quality-of-service limited to subscribers paying for the premium service and further limiting the premium QoS to the times such premium service is selected by cable network subscribers. The present invention satisfies this need for on-demand premium QoS network gaming by utilizing a "gaming agent" (GA) through which a participant can request reserved bandwidth with QoS guarantees for the purpose of playing network games.

The present invention comprises a gaming network having dynamically reserved enhanced game quality-of-service (QoS-game). A gaming agent restricts access to enhanced QoS-game to those participants opting for a higher cost subscription network service. In one preferred embodiment the gaming agent, monitors the time a game participant is utilizing enhanced QoS-game in order to limit charges to actual QoS-game usage. In another preferred embodiment, the gaming agent is maintained by the gaming web server. In yet another embodiment of the present invention, the gaming agent further comprises parental controls. Parental controls are well known in the art and provide means for a user to determine what games on a gaming server are accessible from a game console. By way of illustration and not as a limitation, games may be rated for content and a parental control may be established to permit only games having a rating equal to or less than a prescribed rating be accessed.

DETAILED DESCRIPTION OF THE INVENTION

The present invention relates to methods for providing enhanced quality-of-service to online gaming users of game networks. More specifically, it relates to a method for supporting network-based gaming with quality-of-service (QoS) assigned to an address in a computer network supporting dynamic allocation of quality-of-service. The QoS for gaming is customized to the game being played; the duration of time desired by a gamer, and in some cases the overall network connections that exist between the gamer and the game server.

Figure 1:
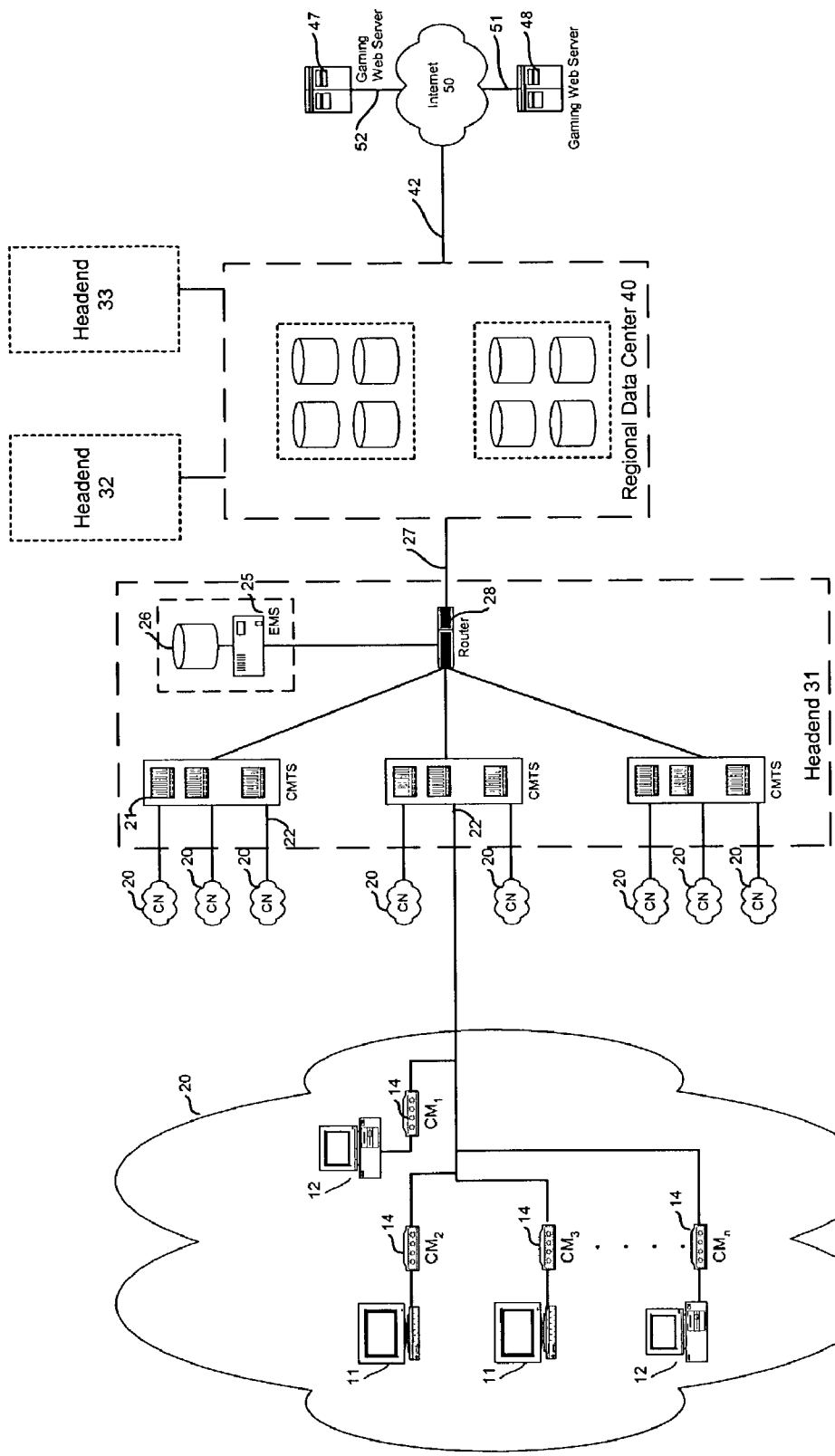
FIG. 1 illustrates a typical gaming network as known in the art and using cable network connectivity.
Figure 2:
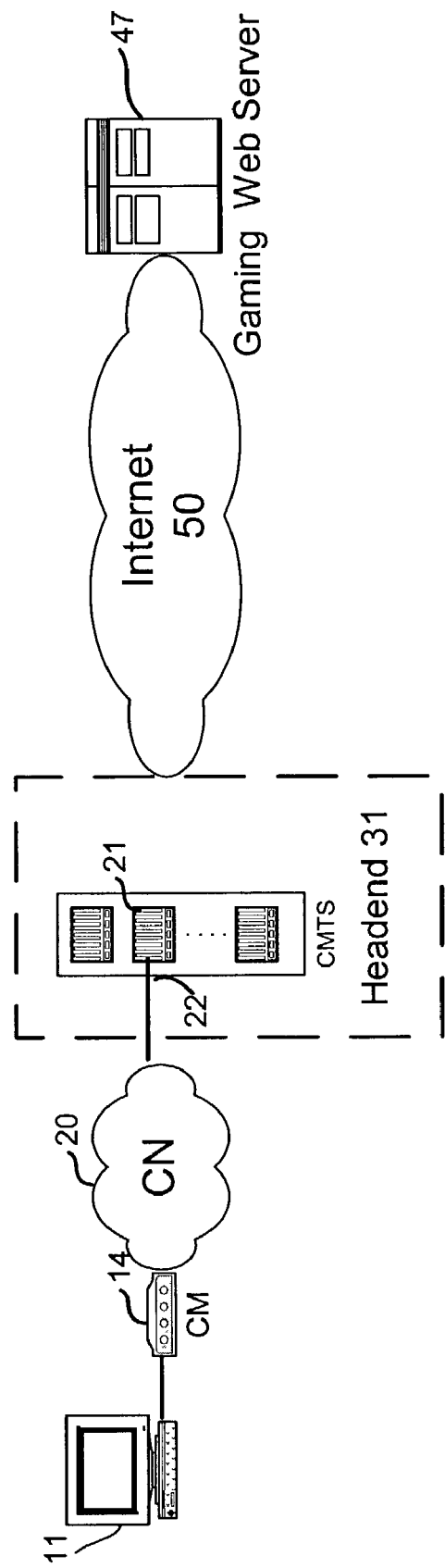
FIG. 2 is a simplified schematic illustrating a gaming network in a data-over-cable environment.

As illustrated in FIG. 2 a typical gaming network comprises a game console 11, gaming web server 47 and network connectivity elements. FIG. 2 depicts for network connectivity a cable network 20, cable modem 14, cable network cable 22, cable management termination system (CMTS) 21 and other Internet connectivity. However, gaming network connectivity is not limited to the devices and means of FIG. 2. Any computer network with suitable bandwidth may be utilized. Examples of other suitable network connectivity include dial-up networks, XDSL, ISDN, local area network, etc.

In the gaming network depicted in FIG. 2, downstream data packets originate in gaming web server 47, are transmitted over the Internet and routed to CMTS 21 in cable network carrier headend 31. From CMTS 21, the downstream packets are routed over cable 22 to cable modem 14 via the cable network. Cable modem 14 is connected to game console 11 (or other device performing as a game console, for example a personal computer). In similar fashion upstream data packets originate in game console 11 and are routed to gaming web server 47 via cable network 20 and Internet connection 50.

Overall quality-of-service to a gamer using a game network of FIG. 2 is dependent upon both downstream QoS and upstream QoS. Downstream QoS, in turn, depends upon the QoS between game console 14 and CMTS 21 and also the QoS between CMTS 21 and gaming web server 47. Similarly, upstream QoS depends on the QoS between gaming web server 47 and CMTS 21 along with QoS between CMTS 21 and game console 14.

Game console 11 may be a special purpose game terminal or a computer (e.g. personal computer) running gaming or graphic emulation programs. Examples of special purpose game terminal includes, for example Microsoft X-box® gaming system and Sony PlayStation2® gaming system. Suitable computers for use as game console 11 include "IBM compatible" personal computers, Apple Macintosh® computers, and the like.

Figure 3A:
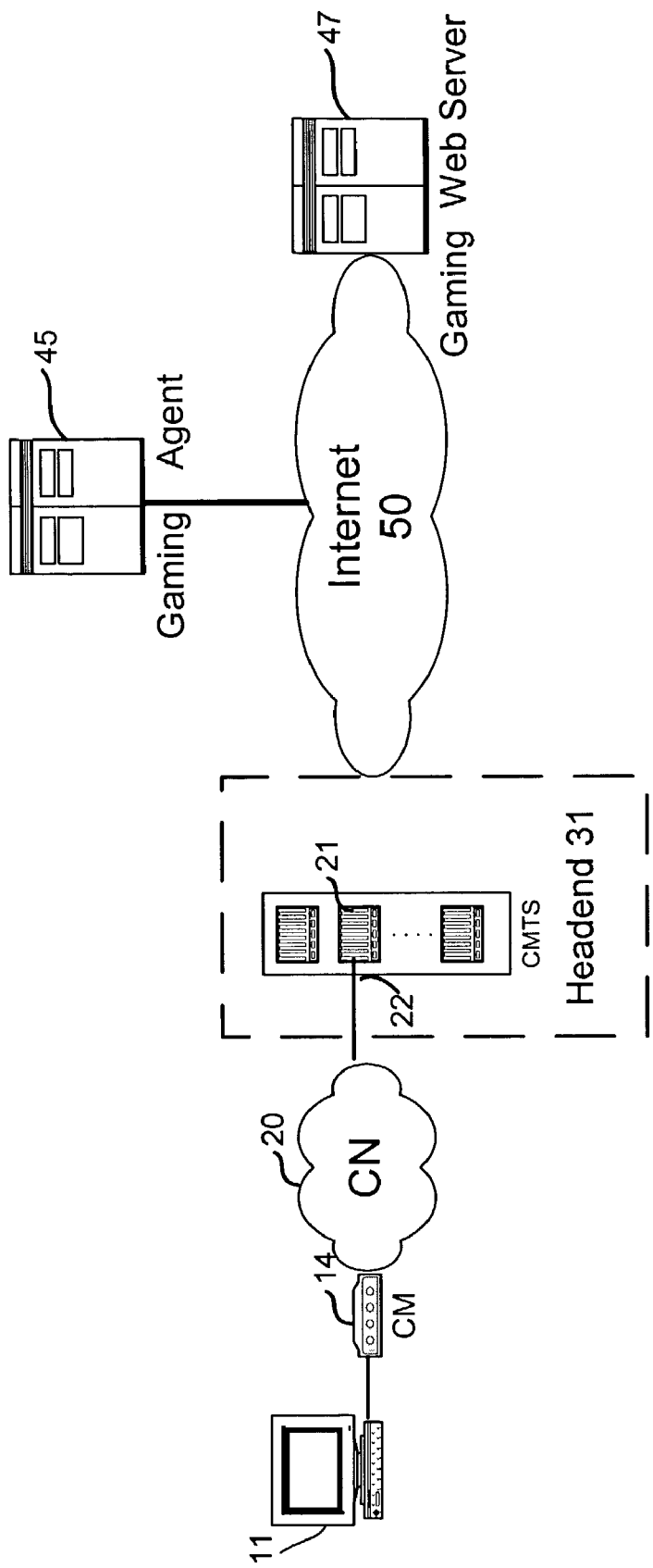
FIG. 3a illustrates a simplified schematic illustrating a gaming network of the present invention in a data-over-cable environment.
Figure 3B:
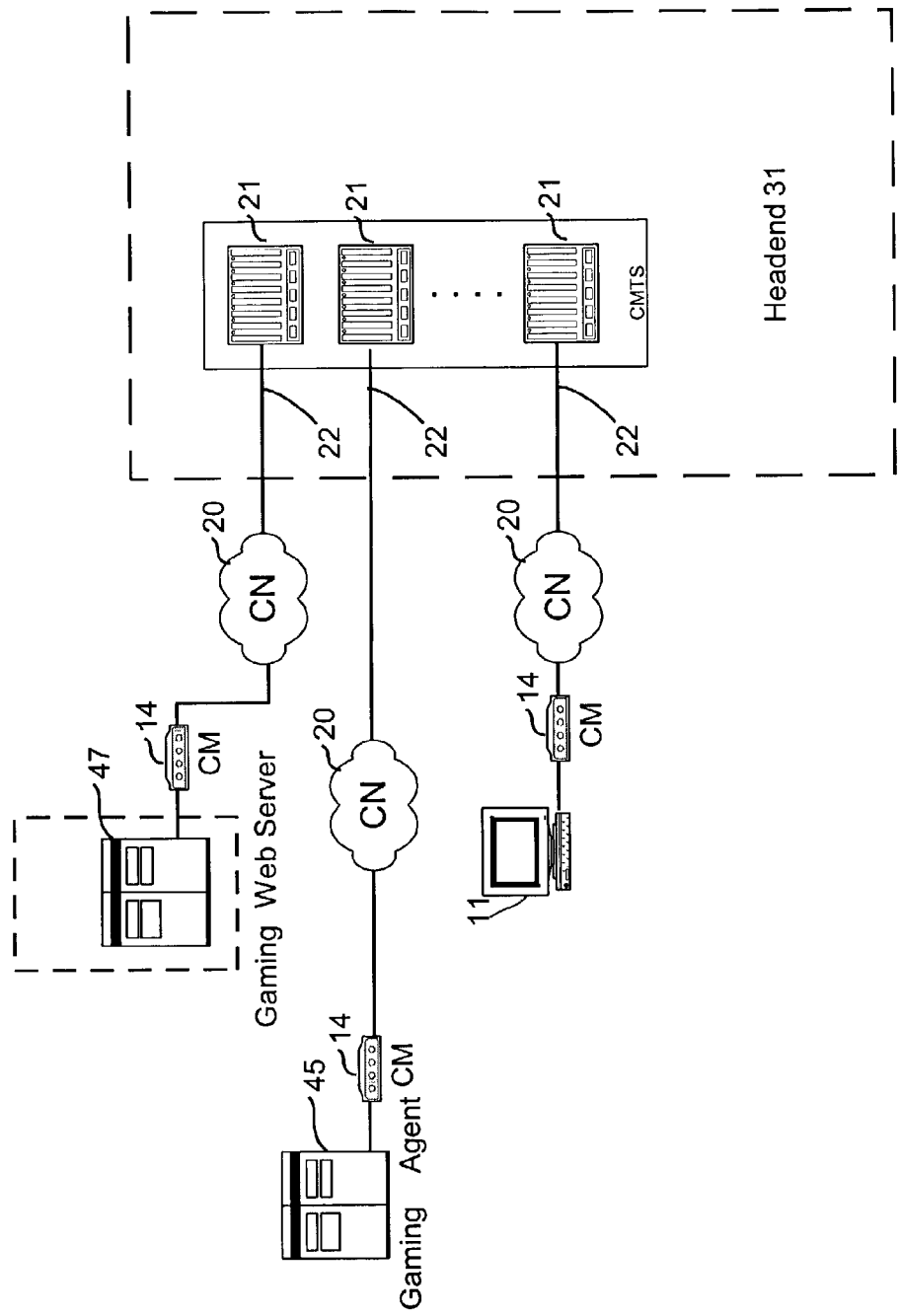
FIG. 3b illustrates a simplified schematic illustrating a gaming network of the present invention in a data-over-cable environment without any non-DOC network connectivity.
Figure 3C:
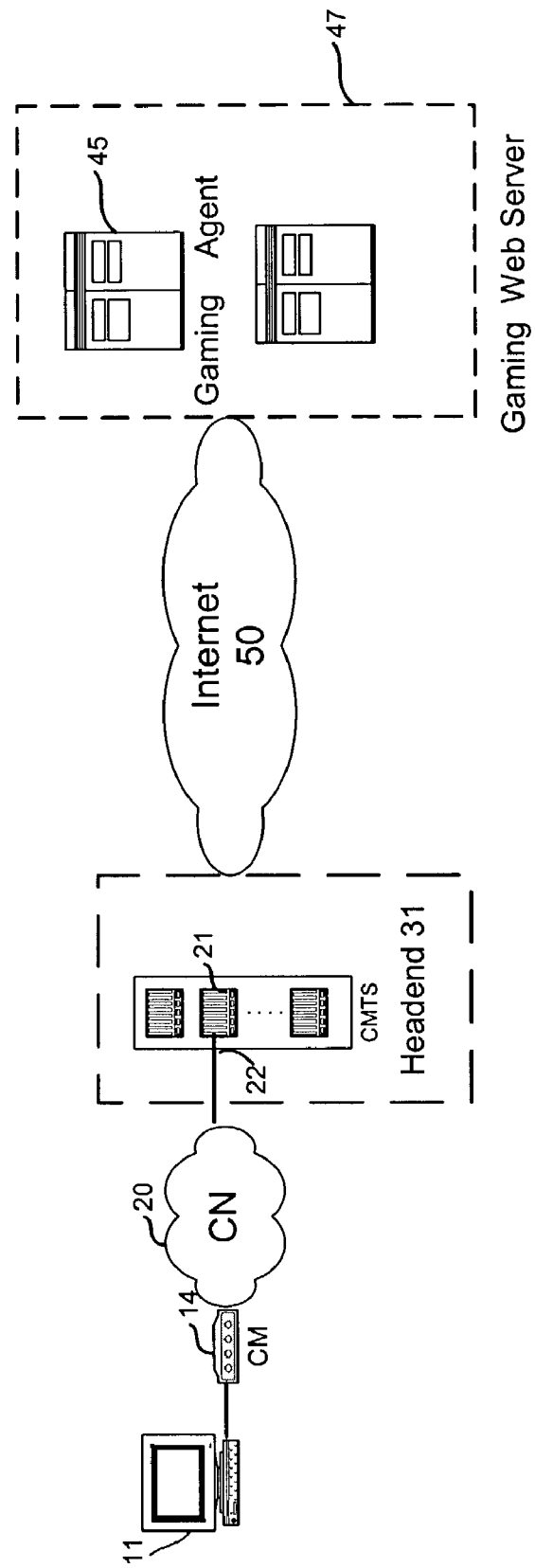
FIG. 3c illustrates a simplified schematic illustrating a gaming network of the present invention in a data-over-cable environment wherein the gaming agent is integrated with the gaming web server.
Figure 3D:
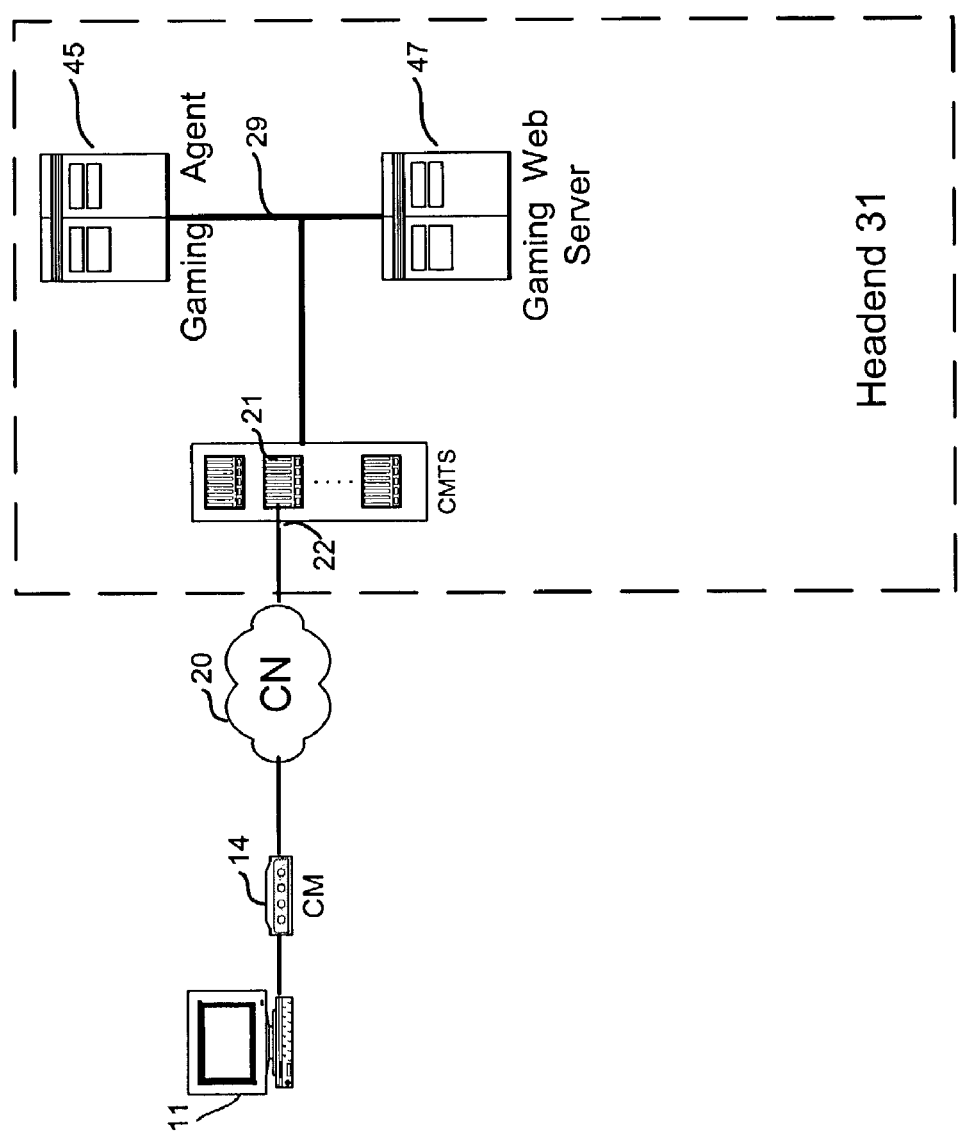
FIG. 3d illustrates a simplified schematic illustrating a gaming network of the present invention in a data-over-cable environment wherein the gaming agent and gaming web server are located in the headend.

FIG. 3a, FIG. 3b, FIG. 3c and FIG. 3d illustrate how a gaming network is modified to incorporate the features of the present invention. Gaming agent 45 is added to the traditional gaming network of FIG. 2 to obtain the desirable features of dynamic QoS-game provisioning and QoS activity tracking. The embodiment illustrated in FIG. 3a illustrates the general case where gaming agent 45 is remotely attached to the gaming network. FIG. 3b illustrates having the gaming network residing on a single carrier's cable network. In the embodiment of FIG. 3c gaming agent 45 has been integrated into gaming web server 47. FIG. 3d illustrates gaming agent 45 in headend 31 and connected to the gaming network via headend network 29. In all embodiments it is preferable that gaming agent 45 have secure, trusted communication with gaming web server 47. Secure communication techniques are known in the art and include public and private key encryption schemes as well as restricted access and physical isolation schemes.

Quality-of-service (QoS) for computer networks commonly refers to guaranteed bandwidth; packet loss rate, delay jitter and packet transfer delay. In order to provide guarantee of a certain QoS, a network needs to make long-term assumptions on the statistical characteristics of its traffic. But network traffic comprises various connections with their own respective characteristics. Additionally, assumptions made by a network regarding a specific connection must be valid for its entire duration. Traffic profiles of interactive multimedia connections are generally unknown when it is setup. Therefore, long-term statistical representations are in general unsuitable for such interactive multimedia connections. Specifically, parameters used in long-term statistical representations do not represent the specific QoS requirements of multimedia applications. It is generally accepted that distributed multimedia applications require a network service that can match the dynamic and heterogeneous bandwidth requirements that are typical of such applications.

Gaming networks have many of the same QoS considerations as interactive multimedia. However such considerations are further complicated by the diversity in the types of online game offerings. Further, QoS for gaming networks is best analyzed from a user's perception. Users associate high QoS for gaming (QoS-game) with game playability. Playability criteria are also functions of the type of online game. As a result, in certain preferred embodiments of the present invention, the gaming agent (illustrated as 45 in FIG. 3a, FIG. 3b, FIG. 3c and FIG. 3d) incorporates a database of desired enhanced QoS criteria that are related to a specific game. Alternatively, QoS criteria can be related to a class of online game. Although a database is a convenient means to relate QoS parameters to a specific game or class of game, other means of identifying enhanced QoS criteria to a game are possible. Such means include look-up tables, firmware encoding, and the like.

Enhanced network QoS is associated with higher costs to network carriers. To offset this cost, carriers desire means to both restrict access to users who wish to "opt in" to the enhanced QoS as well as track and charge fees for use of enhanced gaming. For this reason gaming agent 45 may incorporate a tracking means to charge subscribers for enhanced QoS-game. Charges can be based upon either successful enhanced QoS-game initiation, duration of active enhanced QoS-game, duration of enhanced QoS-game reserved or any combination thereof. Network carriers may also opt to not charge premium network subscribers for using enhanced QoS-game. In this situation gaming agent 45 can either restrict enhanced QoS-game to identified premium subscribers, or in the alternative apply a zero amount charge to identified premium subscribers.

Users who are allowed to utilize enhanced QoS-game are preferably first authenticated. Authentication may occur on a user or game console basis. One form of user authentication requires the user to transmit a user identification and password to the authenticating device. In the case of the present invention, user authentication can occur at the gaming web server, at the gaming agent or at both devices.

Console authentication requires that the game console transmit a user identification and/or password. Once again, either the gaming web server or the gaming agent may perform the authenticating function. Console identification may be embedded in firmware, disguised in software keys, or entered by the console user. Transmission may be initiated by console user or transmitted automatically, for example upon booting of the console, or upon requesting online gaming.

Authentication may also occur on a cable modem basis. Such authentication has the advantage of being controlled by the cable services carrier. However, cable modem authentication may inadvertently authorize multiple users connected to a cable modem router.

Various configurations for gaming networks are possible. Gaming web servers and gaming agents may be physically connected to the same network segment as the game console. Similarly the gaming web server, gaming agent and game console may be connected to a single cable network, CMTS, or same headend router.

In FIG. 3a and FIG. 3c gaming web server 47 is separated from the game console by an Internet connection 50 and cable network 20. It is apparent that for these gaming networks the playability quality-of-service (QoS-game) is dependent upon quality-of-service provided in two different network segments: Segment 1—Internet network 50 connection between headend 31 and gaming web server 51; and Segment 2—network connection 22, 20 between headend 31 and game console 11.

The second segment is eliminated in FIG. 3b where all of the gaming network components are connected to a single carrier's network. FIG. 3b illustrates the use of a single cable network carrier. However, this is not to be considered limiting, as the techniques are equally suitable to other networks, for example XDSL or local area networks.

In terms of Internet QoS, the Internet Engineering Task Force (IETF) has defined two models: Integrated Services (IntServ) and Differentiated Services (DiffServ). IntServ follows the signaled-QoS model, where the end-hosts signal their QoS need to the network, while DiffServ works on a provisioned-QoS model with network elements set up to service multiple classes of traffic of varying QoS requirements. Both IntServ and DiffServ can be driven off a policy base, using the Common Open Policy Server protocol. (CoPS).

The IntServ model relies on Resource Reservation Protocol (RSVP) to signal and reserve the desired QoS for each flow in the network. An IntServ flow is defined as an individual, unidirectional data stream between two applications. Two types of service can be requested via RSVP (assuming adequate network devices). The first type is a very strict guaranteed service that provides for firm bounds on end-to-end delay and assured bandwidth for traffic that conforms to the reserved specifications. The second type is a controlled load service that provides for a better than best-effort and low delay service under light to moderate network loads. Thus, it is possible (at least theoretically) to provide the requisite QoS for every flow in the network, provided it is signaled using RSVP, and the resources are available.

DiffServ uses a relatively simple and coarse method of categorizing network traffic into different classes, and applying QoS parameters to those classes. To accomplish this, packets are first divided into classes by marking the type of service (ToS) byte in the IP header. Once packets are classified at the edge of the network, specific forwarding treatments, formally called Per-Hop Behavior (PHB), are applied on each network element, providing the packet the appropriate delay-bound, jitter-bound, bandwidth, etc. This combination of packet marking and well-defined PHBs results in a scalable QoS solution for any given packet.

For enhanced QoS in a gaming network, appropriate support for QoS requests to IntServ or DiffServ must be provided. In the present invention, the gaming agent provides this support. When requesting enhanced QoS-game, the gaming agent requests the appropriate QoS service (IntServ, DiffServ or other service protocol).

Gaming network connectivity from the network carrier to a game console may take various forms including those of IntServ and DiffServ, discussed above. This connectivity may also take place over a cable network, as exemplified in FIG. 3a, FIG. 3b and FIG. 3c. Cable networks are preferably DOCSIS compliant and more preferably DOCSIS version 1.1 or higher compliant.

In DOCSIS version 1.1 and 2.0 compliant cable networks downstream and upstream network traffic flows are separately considered. For example, DOCSIS version 1.1 has for the basic unit of QoS the service flow, which is a unidirectional sequence of packets transported across between the cable modem and CMTS. A service flow is characterized by a set of QoS parameters such as latency, jitter, and throughput assurances.

Every cable modem establishes a primary service flow in both the upstream and downstream directions. The primary flows maintain connectivity between the cable modem and CMTS at all times. In addition, a DOCSIS version 1.1 cable modem can establish multiple secondary service flows. The secondary service flows either can be permanently created (they persist until the cable modem is reset or powered off) or can be created dynamically to meet the needs of the on-demand traffic being transmitted.

Each service flow has a set of QoS attributes associated with it. These QoS attributes define a particular class of service and determine characteristics such as the maximum bandwidth for the service flow and the priority of its traffic. The class of service attributes can be inherited from a preconfigured CMTS local service class (class-based flows), or they can be individually specified at the time of the creation of the service flow. The QoS attributes of a service flow can be specified in two ways: either explicitly by defining all attributes, or implicitly by specifying a service class name. A service class name is a string that the CMTS associates with a QoS parameter set.

Any service flow can have its QoS parameter set specified in any of three ways:
 1. Explicitly including all traffic parameters;
 2. Indirectly referring to a set of traffic parameters by specifying a service class name; or
 3. Specifying a service class name along with modifying parameters.

When using service-class-based provisioning, the service classes must be configured at the CMTS before cable modems attempt to make a connection.

An example of quality-of-service attributes for a DOCSIS version 1.1 compliant network can be found in documentation for Cisco Systems uBR7200 Series Universal Broadband Routers and is reproduced below in Table 1.

TABLE 1

DOCSIS version 1.1 Compliant Cable Modem - Service Class Parameters

| | |
|---|---|
| activity-timeout | Specifies the quality of service parameter set activity timeout (0-65535). |
| admission-timeout | Specifies the admitted quality of service parameter set timeout (0-65535). |
| grant-interval | Specifies the grant interval (0-4294967295 micro-seconds). |
| grant-jitter | Specifies the grant jitter (0-4294967295 micro-seconds). |
| grant-size | Specifies the grant size (0-65535 bytes). |
| grants-per-interval | Specifies the grants per interval (0-127 grants). |
| max-burst | Specifies the maximum transmission burst (1522-4294967295 bytes). |
| max-concat-burst | Specifies the maximum concatenation burst (0-65535 bytes). |
| max-latency | Specifies the maximum latency allowed (0-4294967295 micro-seconds). |
| max-rate | Specifies the maximum rate (0-4294967295 bps). |
| min-packet-size | Specifies the minimum packet size for reserved rate (0-65535 bytes). |
| min-rate | Specifies the minimum rate (0-4294967295 bps). |
| name | Specifies the service-class name string. |
| poll-interval | Specifies the poll interval (0-4294967295 microseconds). |
| poll-jitter | Specifies the poll jitter (0-4294967295 microseconds). |
| priority | Specifies the priority (0-7, where 7 is the highest priority). |
| req-trans-policy | Specifies the request transmission policy bit field (0x0-0xFFFFFFFF in hexadecimal). |
| sched-type | Specifies the service class schedule type: 2-Best-Effort Schedule Type 3-Non Real-Time Polling Service Schedule Type (not supported in Cisco IOS Release 12.1 CX) 4-Real-Time Polling Service Schedule Type 5-Unsolicited Grant Service with Activity Detection Schedule Type 6-Unsolicited Grant Service Schedule Type |
| tos-overwrite | Overwrites the type-of-service (ToS) byte by setting the mask bits to specific value (0x1-0xFF in hexadecimal). |

Integral to the gaming networks of the present invention is the gaming agent.

FIG. 3a, FIG. 3b, FIG. 3c and FIG. 3d illustrate various preferred embodiments of the present invention. During a game session, downstream data packets originate in gaming web server 47, are transmitted and routed to cable management termination system (CMTS) 21 in headend 31. From CMTS 21, the downstream packets are routed over cable 22 to cable modem (CM) 14 via the cable network. Cable modem (CM) 14 is connected to game console 11 (or other device performing as a game console, for example a personal computer). In similar fashion upstream data packets originate in game console 11 and are routed to gaming web server 47 via cable network 20 and other intervening networks (for example, in FIG. 3a over Internet 50). Gaming agent 45 is connected to the game network and provides desired game functions not available in other networks.

In FIG. 3a gaming agent 45 is remotely attached to the gaming network. In contrast FIG. 3c illustrates gaming agent 45 as being integrated into gaming web server 47. FIG. 3b illustrates gaming agent 45 attached to a single cable network carrier's network. In FIG. 3b, gaming agent 45 may also be integrated into gaming web server 47. Such a modification is included in the scope of the present invention.

Gaming agent 45 and gaming web server 47 may also be located in headend 31, as illustrated in FIG. 3d.

In all embodiments it is preferable that gaming agent 45 has secure, trusted communication with gaming web server 47. Secure communication techniques are known in the art and include techniques such as public and private key encryption schemes as well as restricted access and physical isolation schemes. With the embodiments such as illustrated in FIG. 3c, secure communication between gaming agent 45 and gaming web server 47 is inherent. In situations where the inherent security suffices, encryption may be eliminated.

Gaming agent 45 provides four major functions: 1) authorizing use of enhanced QoS-game; 2) polling game network service availability; 3) requesting enhanced network QoS, tailored for the specific game selected; and optionally 4) tracking durations for use of enhanced QoS-game. Tracking durations is needed in order to charge game users for the amount of time using enhanced QoS-game. When the network carrier does not separately charge for enhanced QoS-game time, this function can be omitted.

Another optional function of the gaming agent is a scheduler. With a scheduler function, a game user is allowed to enter reservation times for enhanced QoS-game. The gaming agent billing routines can then be tailored to charge different fees for reserved-and-activated enhanced QoS-game as well as reserved-but-not-activated enhanced QoS-game.

Means of fulfilling the gaming agent functions are known in the art and must be customized to a particular gaming network. The gaming agent implementation may utilize common computer and software components, including, but not limited to, computer servers with UNIX operating system software.

A special situation may arise when the gaming network is to be integrated into a voice over Internet (VoIP) network. A network carrier may provide a voice gateway or other means for making requests for enhanced voice quality-of-service. In this situation, the VoIP gateway and gaming agent are required to coordinate requests for enhanced QoS. One solution is to integrate the gaming agent and VoIP gateway into a single hardware and software system. An integrated VoIP/gaming agent would respond, coordinate and prioritize QoS requests for both enhanced gaming and VoIP. It is envisioned that the VoIP/gaming agent would have database entries to support VoIP as well as VoIP combined with enhanced QoS-game. Such an integrated VoIP/gaming agent would then separately perform call signalling functions (e.g. notification of receiving a call).

Figure 4:
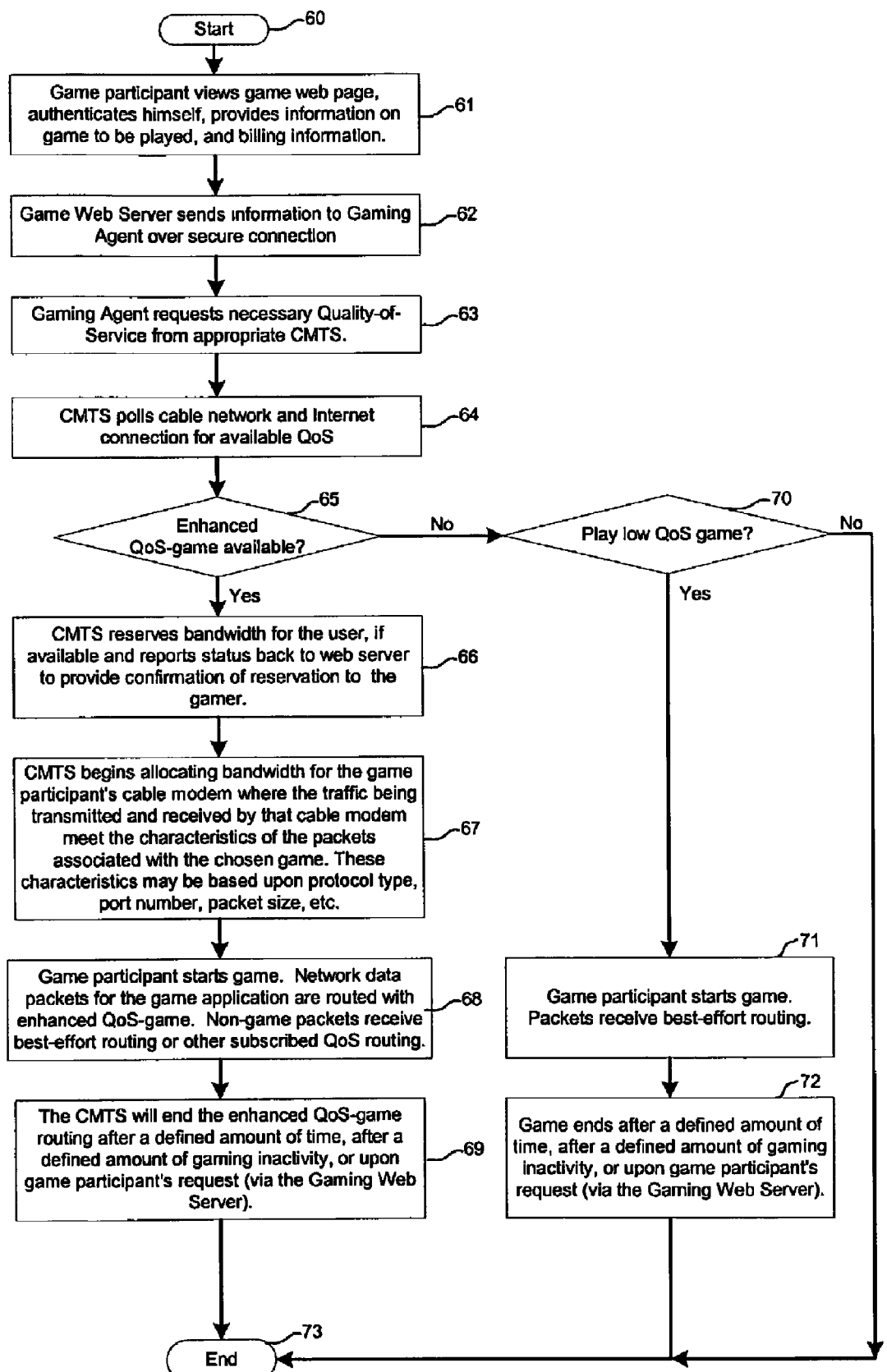
FIG. 4 illustrates a flowchart for requesting enhanced QoS-game.

FIG. 4 is a flow chart of a typical process for obtaining enhanced QoS-game that illustrates one example of how gaming agent 45 interacts with other components of the gaming network.

The process begins at process start 60 and continues to process end 73. It is to be understood that FIG. 4 is exemplary and it is expected that modification to the flow chart is normally required to accommodate various network configurations and network carrier business policies.

An online game participant transmits game session initiation 61. A game participant views game web page 62, authenticates himself, provides information on game to be played, and billing information. Information entered 62 is then transmitted to the gaming agent 63. It is important that transmittal of game participant information to the gaming agent take place over a secure connection in order to prevent fraud, prevent theft of services and prevent theft of participant identity. Means of secure transmission are known in the art and include encryption techniques as well as methods of limiting the transmitted information to non-sensitive information (e.g. partial customer account number and password).

Upon receipt of valid authorizing information about the game participant 63, the gaming agent requests reservation of the necessary Quality-of-Service from the appropriate cable management termination system (CMTS) 64. CMTSs are used in data-over-cable networks, for example DOCSIS version 1.1 compliant networks. When the gaming network contains non-DOCSIS segments, the gaming agent makes the appropriate request to reserve QoS in other network segments. In general separate requests are required for downstream DOCSIS quality-of-service vs. downstream non-DOCSIS quality-of-service.

As this illustrates, the gaming agent is needed for efficient and user transparent requests for quality-of-service. Multiple QoS requests, often with multiple QoS parameters are made automatically by the gaming agent and include: downstream DOCSIS QoS request; upstream DOCSIS QoS request; downstream Internet QoS request; and upstream Internet QoS request. Each request may comprise numerous parameters, as for example illustrated in Table 1.

The gaming agent may use default enhanced QoS gaming parameters or optionally comprise a database containing QoS parameters related to selected game identification words. When present, this database feature can be used to "tune" QoS requests so that gaming network resources can be most efficiently allocated.

Upon receipt of a QoS request, the CMTS polls the cable network and attempts to reserve sufficient QoS 64. Similarly, other network segment QoS controllers receiving gaming agent requests attempt to reserve sufficient QoS. The other network segment controllers may include IntServ as well as DiffServ protocol controllers. The CMTS along with other network segment QoS controllers, if any, then report back to the gaming agent whether or not sufficient QoS was reserved.

Based upon those responses received 65 the gaming agent will decide to either request the enhanced QoS 66 or transmit a query for instructions to the game participant 70. The transmitted query allows the game participant to either play the game over best-effort QoS 71-72 or, in the alternative, to abandon the game and end the game session 73.

Provided results from the requests to reserve QoS were positive 65, the CMTS and other network segment QoS controllers, if any commit the reserved QoS resources to the gaming session 66. This results in the CMTS (and other network segment QoS controllers, if any) allocating QoS for the game participant's cable modem where the traffic being transmitted and received by that cable modem meet the characteristics of the packets associated with the chosen game 67.

The QoS-game characteristics may be based upon protocol type, port number, packet size, etc. As indicated above, the gaming agent may comprise a database of quality-of-service parameters related to game identifiers. If network QoS availability is only slightly limited, then the use of a parameter database may be unnecessary. For example, in the gaming network of FIG. 3c, sufficient bandwidth and other QoS parameters may be available for 99% or more of the time. Enhanced QoS-game in this situation may be simplified to a set of high QoS settings compatible with all online games, eliminating the need for a QoS-game database.

Game participant then starts game 68. Network data packets for the game application are routed with enhanced QoS-game. Non-game packets receive best-effort or other QoS service (for example QoS for Voice-over-IP traffic).

The CMTS can end the enhanced QoS-game routing after a defined amount of time, after a defined amount of gaming inactivity, or upon game participant's request (via the Gaming Web Server) 69. As the CMTS ends the enhanced gaming session, a notification is transmitted to the gaming agent. This notification triggers an end-of-session tracking event (e.g. for charging fees to subscribers) in the gaming agent. The gaming agent, in turn, triggers the transmittal of requests to stop enhanced QoS in other non-cable network segments, thereby ending charges to the user for the enhanced QoS.

If the gaming agent comprises a scheduler, the gaming agent may also initiate a shutdown of the enhanced QoS-game session at the end of the reserved game period by requesting best-effort class QoS. In addition, the gaming agent can alert game participants of impending loss of enhanced QoS by transmitting a cautionary message prior to releasing best-effort class QoS requests.

The gaming agent may also enforce business policies of network carriers and gaming web service providers. For example, the gaming agent may allow short trial periods of enhanced QoS-game to entice potential online game participants to agree to higher subscription fees. Another envisioned business policy the gaming agent may enforce is terminating enhanced QoS-game service when unpaid charges accumulated for a game participant exceed credit limits.

As a result of the CMTS and gaming agent an enhanced QoS-game session ends after a defined amount of time, after a defined amount of gaming inactivity, upon game participant's request (via the Gaming Web Server) or upon requests originating in the gaming agent 73.

Although the present invention has been described in terms of specific embodiments, various types of general purpose or specialized computer apparatus may be used with or perform operations in accordance with the teachings described herein. Additionally, the claims should not be read as limited to the described order or elements unless stated to that effect. Therefore, all embodiments that come within the scope and spirit of the following claims and equivalents thereto are claimed as the invention. The scope of the invention is only to be limited by the following claims:

What is claimed is:

1. A method for providing enhanced quality-of-service to an online gaming user comprising:
    connecting a game console to a gaming web server, wherein the gaming web server is connected to a cable network and wherein the game console is connected to the cable network via a cable modem;
    selecting a game from the gaming web server;
    matching the game selection to a set of quality-of-service parameters determined by the gaming agent from the game selection without further input from the online gaming user;
    transmitting a request from the gaming agent to a cable modem termination system (CMTS) to provision the cable network with the set of quality-of-service parameters determined by the gaming agent from the game selection, wherein the CMTS comprises instructions for managing network resources associated with the cable network;
    polling the cable network from the CMTS to determine whether the CMTS can grant the quality of service request; and
    if the CMTS grants the quality of service request, then providing service over the cable network to the game console in accordance with the quality-of-service parameters determined from the game selection by the gaming agent.

2. The method of claim 1, wherein the game console comprises a personal computer.

3. The method of claim 1 further comprising transmitting gaming user authentication information to the gaming web server from the game console.

4. The method of claim 3, wherein the gaming web server restricts online gaming to authenticated gaming users.

5. The method of claim 3, further comprising transmitting gaming user authentication information to the gaming agent from the gaming web server.

6. The method of claim 5, wherein the gaming agent restricts enhanced quality-of-service-game to authenticated gaming users.

7. The method of claim 1 further comprising:
    recording the time duration of enhanced quality-of-service game provisioning; and
    charging a time-duration based fee for enhanced quality-of-service.

8. The method of claim 7, wherein the time-duration based fee is charged for the time that enhanced quality-of-service is active.

9. The method of claim 7, wherein the time-duration based fee is charged for the time that enhanced quality-of-service is reserved.

10. The method of claim 1, wherein the available quality-of-service parameters are selected from a database of desired gaming quality-of-service parameters indexed to a game identifier.

11. The method of claim 1, wherein the available quality-of-service parameters are selected from a database of desired gaming quality-of-service parameters indexed to a class-of-game identifier.

12. The method of claim 1, wherein the gaming agent receives data from the gaming web server and transmits data to the gaming web server over a secure communications network.

13. The method of claim 12, wherein the secure communications network is a data encrypted communications network.

14. The method of claim 1, wherein the gaming agent is integrated with the gaming web server.

15. The method of claim 1, wherein the gaming agent further comprises parental controls.

16. The method of claim 1, wherein the enhanced quality-of-service request further comprises an upstream enhanced quality-of-service request and a downstream enhanced quality-of-service request.

17. The method of claim 16, wherein the gaming agent matches the upstream enhanced quality-of-service request and the downstream enhanced quality-of-service request by referring to a database comprising fields for game identification, upstream quality-of-service fields and downstream quality-of-service fields.

18. The method of claim 17, wherein the upstream quality-of-service fields comprise poll-interval, poll-jitter, minimum-rate, maximum-rate, maximum-burst, maximum-concatenation-burst, request-transmission-policy, activity-timeout, admission-timeout, schedule-type and TOS-overwrite.

19. The method of claim 17, wherein the downstream quality-of-service fields comprise priority, minimum-rate, maximum-rate, maximum-burst, activity-timeout and admission-timeout.

20. A method for providing enhanced quality-of-service to an online gaming user comprising:
    connecting a game console to a cable network component of a gaming network;
    connecting the cable network component to a cable management termination system (CMTS), wherein the CMTS is further connected to an Internet component of the gaming network;
    selecting a game from a gaming web server, wherein the gaming web server is connected to the gaming network;
    transmitting the game selection from the gaming web server to a gaming agent;
    selecting enhanced quality-of-service parameters from available quality-of-service parameters determined by the gaming agent from the game selection without further input from the online gaming user;
    transmitting a first request for enhanced quality-of-service network provisioning from the gaming agent to the CMTS, wherein the first request comprises a selected quality of service parameter determined from the game selection;

at the CMTS, determining whether cable network resources are available to grant the first request;
if the cable network resources are available to grant the first request, then reserving cable network resources consistent with the first request; and
providing game data to the game console from the gaming web server over the gaming network using the cable network resources.

21. The method of claim 20 further comprising:
transmitting a second request for enhanced quality-of-service network provisioning from the gaming agent to a quality-of-service controller, wherein the quality of service controller comprises instructions for managing network resources associated with the Internet component and wherein the second request comprises a selected quality of service parameter determined from the game selection;
polling the Internet component to determine whether the quality-of-service controller can grant the second request; and
if the quality-of-service controller grants the second request, then reserving quality-of-service network resources consistent with the second request.

22. The method of claim 21 wherein the second request comprises an enhanced quality-of-service request to an Integrated Service network carrier.

23. The method of claim 21 wherein the second request comprises an enhanced quality-of-service request to a Differential Service network carrier.

24. The method of claim 20 wherein the game console comprises a personal computer.

25. The method of claim 20, wherein the game console transmits gaming user authentication information to the gaming web server.

26. The method of claim 25, wherein the gaming web server restricts online gaming to authenticated gaming users.

27. The method of claim 25, wherein the gaming web server transmits gaming user authentication information to the gaming agent.

28. The method of claim 27, wherein the gaming agent restricts enhanced quality-of-service to authenticated gaming users.

29. The method of claim 20 further comprising:
recording the time duration of enhanced quality-of-service provisioning; and
charging the gaming user a time-duration based fee for enhanced quality-of-service.

30. The method of claim 29 wherein the time-duration based fee is charged for the time that enhanced quality-of-service is active.

31. The method of claim 29 wherein the time-duration based fee is charged for the time that enhanced quality-of-service is reserved.

32. The method of claim 20, wherein the available quality-of-service parameters are selected from a database of desired gaming quality-of-service parameters indexed to a game identifier.

33. The method of claim 20, wherein the available quality-of-service parameters are selected from a database of desired gaming quality-of-service parameters indexed to a class-of-game identifier.

34. The method of claim 20 wherein the gaming agent receives data from the gaming web server and transmits data to the gaming web server over a secure communications network component of the gaming network.

35. The method of claim 34, wherein the secure communications network component is a data encrypted communications network.

36. The method of claim 20 wherein the gaming agent is integrated with the gaming web server.

37. The method of claim 20 wherein the gaming agent further comprises parental controls.

38. The method of claim 20 wherein the first and second enhanced quality-of-service requests further comprise an upstream enhanced quality-of-service request and a downstream enhanced quality-of-service request.

39. The method of claim 38 wherein the gaming agent selects the upstream enhanced quality-of-service request and the downstream enhanced quality-of-service request from a database comprising fields for game identification, upstream quality-of-service fields and downstream quality-of-service fields.

40. The method of claim 39 wherein the upstream quality-of-service fields are selected from the group consisting of a poll-interval, a poll-jitter, a minimum-rate, a maximum-rate, a maximum-burst, a maximum-concatenation-burst, a request-transmission-policy, an activity-timeout, an admission-timeout, a schedule-type and a TOS-overwrite.

41. The method of claim 39 wherein the downstream quality-of-service fields are selected from the group consisting of a priority, a minimum-rate, a maximum-rate, a maximum-burst, an activity-timeout and an admission-timeout.

42. A system for providing enhanced quality-of-service to an online gaming user comprising:
a game console connected to a gaming network;
a gaming web server connected to the gaming network so as to receive a gaming user selection for a game available for the game console; and
a gaming agent server comprising instructions for:
receiving the selected game selection transmitted from the gaming web server;
selecting enhanced quality-of-service parameters from available quality-of-service parameters determined by the gaming agent server from the game selection without further input from the online gaming user;
transmitting a request for enhanced quality-of-service-game network provisioning to a quality-of-service controller, wherein the request comprises a selected quality of service parameter determined from the game selection;
wherein the quality of service controller comprises instructions for:
managing network resources associated with the gaming network;
polling the gaming network to determine whether the quality-of-service controller can grant the request;
if the quality-of-service controller grants the request, then reserving quality-of-service network resources consistent with the request; and
wherein the gaming web server further comprises instructions for providing game data to the game console over the gaming network using the quality-of-service network resources.

43. The system of claim 42, wherein the game console comprises instructions for transmitting gaming user authentication information to the gaming web server.

44. The system of claim 43, wherein the gaming web server comprises instructions for restricting online gaming to authenticated gaming users.

45. The system of claim 43, wherein the gaming web server further comprises instructions for transmitting gaming user authentication information to the gaming agent.

46. The system of claim 45, wherein the gaming agent further comprises instructions for restricting enhanced quality-of-service-game to authenticated gaming users.

47. The system of claim 42, wherein gaming agent further comprises instructions for recording the time duration of enhanced quality-of-service game provisioning and wherein system further comprises a billing system adapted to charge the gaming user a time-duration based fee for enhanced quality-of-service.

48. The method of claim 47, wherein the time-duration based fee is charged for the time that enhanced quality-of-service is active.

49. The system of claim 47, wherein the time-duration based fee is charged for the time that enhanced quality-of-service is reserved.

50. The system of claim 42, wherein the available quality-of-service parameters are selected from a database of desired gaming quality-of-service parameters indexed to a game identifier.

51. The system of claim 42, wherein gaming agent further comprises instructions for selecting the available quality-of-service parameters from a database of desired gaming quality-of-service parameters indexed to a class-of-game identifier.

52. A gaming agent server for providing enhanced quality-of-service for an online gaming user, the gaming agent server comprising:
a processor; and
memory in addressable communication with the processor, the memory bearing software instructions adapted to enable the gaming agent server to perform the steps of:
receiving a game selection transmitted from a gaming web server;
selecting enhanced quality-of-service parameters from a database of quality-of-service parameters determined from the game selection by the gaming agent server without further input from the online gaming user;
transmitting a request for enhanced quality-of-service network provisioning to a quality of service controller, wherein the quality of service controller comprises instructions for managing network resources associated with the gaming network; and
if the quality-of-service controller grants the request, then reserving quality-of-service network resources consistent with the request;
recording the time-duration of enhanced quality-of-service network provisioning; and
releasing enhanced quality-of-service network provisioning upon completion of the game.

53. A method for providing enhanced quality-of-service to online gaming users comprising:
connecting a game console to a cable network component of a gaming network;
connecting the cable network component to a cable management termination system (CMTS), wherein the CMTS is further connected to an Internet component of the gaming network;
selecting a game from a gaming web server, wherein the gaming web server is connected to the gaming network;
selecting enhanced quality-of-service parameters from available quality-of-service parameters determined by the gaming web server from the game selection without further input from the online gaming user;
transmitting the selected quality-of service parameters from the gaming web server to a gaming agent;
transmitting a first request for enhanced quality-of-service network provisioning from the gaming agent to the CMTS, wherein the first request comprises a selected quality of service parameter determined from the game selection;
at the CMTS, determining whether cable network resources are available to grant the first request;
if the cable network resources are available to grant the first request, then reserving cable network resources consistent with the first request; and
providing game data to the game console from the gaming web server over the gaming network using the cable network resources.

54. The method of claim 53 further comprising:
transmitting a second request for enhanced quality-of-service network provisioning from the gaming agent to a quality-of-service controller, wherein the quality of service controller comprises instructions for managing network resources associated with the Internet component and wherein the second request comprises a selected quality of service parameter determined from the game selection without further input from the online gaming user;
polling the Internet component to determine whether the quality-of-service controller can grant the second request; and
if the quality-of-service controller grants the second request, then reserving quality-of-service network resources consistent with the second request.

55. The method of claim 54 wherein the second request comprises an enhanced quality-of-service request to an Integrated Service network carrier.

56. The method of claim 54 wherein the second request comprises an enhanced quality-of-service request to a Differential Service network carrier.

57. The method of claim 53 wherein the game console comprises a personal computer.

58. The method of claim 53, wherein the game console transmits gaming user authentication information to the gaming web server.

59. The method of claim 58, wherein the gaming web server restricts online gaming to authenticated gaming users.

60. The method of claim 58, wherein the gaming web server transmits gaming user authentication information to the gaming agent.

61. The method of claim 60, wherein the gaming agent restricts enhanced quality-of-service to authenticated gaming users.

62. The method of claim 53 further comprising:
recording the time duration of enhanced quality-of-service provisioning; and
charging the gaming user a time-duration based fee for enhanced quality-of-service.

63. The method of claim 62 wherein the time-duration based fee is charged for the time that enhanced quality-of-service is active.

64. The method of claim 62 wherein the time-duration based fee is charged for the time that enhanced quality-of-service is reserved.

65. The method of claim 53, wherein the available quality-of-service parameters are selected from a database of desired gaming quality-of-service parameters indexed to a game identifier.

66. The method of claim 53, wherein the available quality-of-service parameters are selected from a database of desired gaming quality-of-service parameters indexed to a class-of-game identifier.

67. The method of claim 53 wherein the gaming agent receives data from the gaming web server and transmits data to the gaming web server over a secure communications network component of the gaming network.

68. The method of claim 67, wherein the secure communications network component is a data encrypted communications network.

69. The method of claim 53 wherein the gaming agent is integrated with the gaming web server.

70. The method of claim 53 wherein the gaming agent further comprises parental controls.

71. The method of claim 53 wherein the first and second enhanced quality-of-service requests further comprise an upstream enhanced quality-of-service request and a downstream enhanced quality-of-service request.

72. The method of claim 71 wherein the gaming agent selects the upstream enhanced quality-of-service request and the downstream enhanced quality-of-service request from a database comprising fields for game identification, upstream quality-of-service fields and downstream quality-of-service fields.

73. The method of claim 72 wherein the upstream quality-of-service fields are selected from the group consisting of a poll-interval, a poll-jitter, a minimum-rate, a maximum-rate, a maximum-burst, a maximum-concatenation-burst, a request-transmission-policy, an activity-timeout, an admission-timeout, a schedule-type and a TOS-overwrite.

74. The method of claim 72 wherein the downstream quality-of-service fields are selected from the group consisting of a priority, a minimum-rate, a maximum-rate, a maximum-burst, an activity-timeout and an admission-timeout.

* * * * *